United States Patent [19]

Thomas

[11] Patent Number: 4,569,128
[45] Date of Patent: Feb. 11, 1986

[54] TELEPHONE EQUIPMENT INSTALLATION TOOL

[75] Inventor: Stephen M. Thomas, Torrington, Conn.

[73] Assignee: The Siemon Company, Watertown, Conn.

[21] Appl. No.: 509,630

[22] Filed: Jul. 1, 1983

[51] Int. Cl.⁴ .............................................. B23P 19/00
[52] U.S. Cl. ........................................... 29/751; 7/107
[58] Field of Search ................. 29/750, 751, 752, 753, 29/754, 758, 837, 838, 566.4; 7/107

[56] References Cited

U.S. PATENT DOCUMENTS

| | | | |
|---|---|---|---|
| 3,947,904 | 4/1976 | Hayes | 7/107 |
| 4,048,710 | 9/1977 | Nijman | 29/753 |
| 4,194,256 | 3/1980 | Knickerbocker | 29/751 |
| 4,451,947 | 6/1984 | Frieber | 7/107 |
| 4,451,948 | 6/1984 | Goodrich et al. | 7/107 |

FOREIGN PATENT DOCUMENTS 1237399  6/1971  United Kingdom ................. 29/753

Primary Examiner—Howard N. Goldberg
Assistant Examiner—P. W. Echols
Attorney, Agent, or Firm—Fishman & Dionne

[57] ABSTRACT

A multi-purpose tool for the installation of telephone terminal equipment is presented. Multiple functions and devices are incorporated into the tool specifically to meet the needs of such equipment in Great Britain, including a staple holder device whereby telephone cable is positioned and stapled to a surface, a breakout tab removal device and a wire installation device for installing wire in electrical connectors of the type used in Great Britain.

18 Claims, 5 Drawing Figures

TELEPHONE EQUIPMENT INSTALLATION TOOL

BACKGROUND OF THE INVENTION

This invention relates to the field of telephone equipment installation tools. More particularly, this invention relates to a new and improved telephone equipment installation tool having an assortment of terminal equipment installation devices finding wide applicability in telephone communication systems such as that found in Great Britain.

Multi-purpose tools for installing telephone terminal equipment are well known to those skilled in the art. These tools provide the telephone installer with a variety of devices which accomplish many different and necessary installation functions. These tools have an added advantage in that the assortment of labor saving devices are all conveniently located on the same lightweight tool.

Tools of the above-discussed type used in conjunction with standard telephone equipment found in the United States are known in the prior art (No. 953A & AS Tools by Western Electric Co., Inc.), and an improved version of such tool is disclosed in copending U.S. patent application Ser. No. 510,324, now abandoned, filed contemporaneously with the present invention and assigned to the assignee hereof.

That particular improved telephone installation tool includes means for stripping the insulation from small gauge cable wires in addition to standard apparatus to effect cable jacket stripping, a staple holder and positioner which provides accurate placement of wire staples, a tab remover slot for bending off breakout tabs on modular jack connecting blocks and a ruler for measuring wire strip lengths.

While multi-purpose tools of the above described type have found wide acceptance in the United States telephone industry, this has not been the case in other countries, such as Great Britain, where different types of telephone equipment are utilized. This is because many of the particular devices or functions of the U.S. type tools cannot be used within, for example, the British telephone system. This non-interchangeability is caused, in part, by differences in the dimensional standards and physical configurations of terminal equipment in other systems relative to U.S. equipment. It is highly desireable to have a telephone equipment installation tool to fit the special needs and requirements of equipment used in Great Britain.

SUMMARY OF THE INVENTION

The above discussed and other problems of the prior art are overcome or substantially alleviated by the telephone installation tool of the present invention. In accordance with the present invention, a one-piece multi-purpose telephone installation tool suitable for use in conjunction with, for example, British telephone equipment has incorporated therein a variety of desirable and effective functions or devices which can be easily used by the equipment installer.

The telephone installation tool of the present invention includes a novel staple holder and positioner which provides accurate placement of standard staples used for CATV wiring, a novel installing device for inserting telephone cable wires into conventional multifingered electrical connectors, and a novel breakout tab remover suitable for use on junction boxes found in such countries as Great Britain. The tool also includes a means to remove cable jacket similar to the prior art as shown in the tool in U.S. patent application Ser. No. 510,324.

The novel incorporation of the above enumerated features on a telephone equipment installation tool for use on telephone equipment such as that found in Great Britain creates a low cost and highly efficient multiple function product.

The above discussed and other advantages of the present invention will be apparent to and understood by those skilled in the art from the following detailed description and drawings.

BRIEF DESCRIPTION OF THE DRAWINGS

Referring now to the drawings, wherein like elements are numbered in the several Figures.

DESCRIPTION OF THE PREFERRED EMBODIMENT

Figure 1:
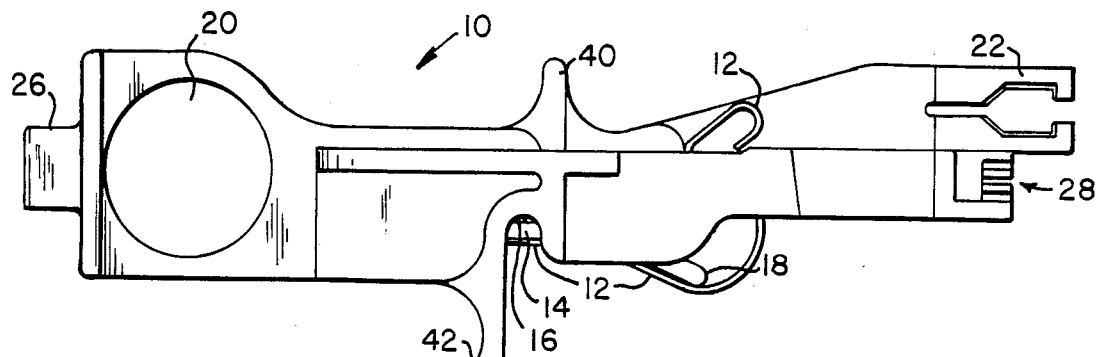
FIG. 1 is a front elevation view of a telephone equipment installation tool in accordance with the present invention.
Figure 2:
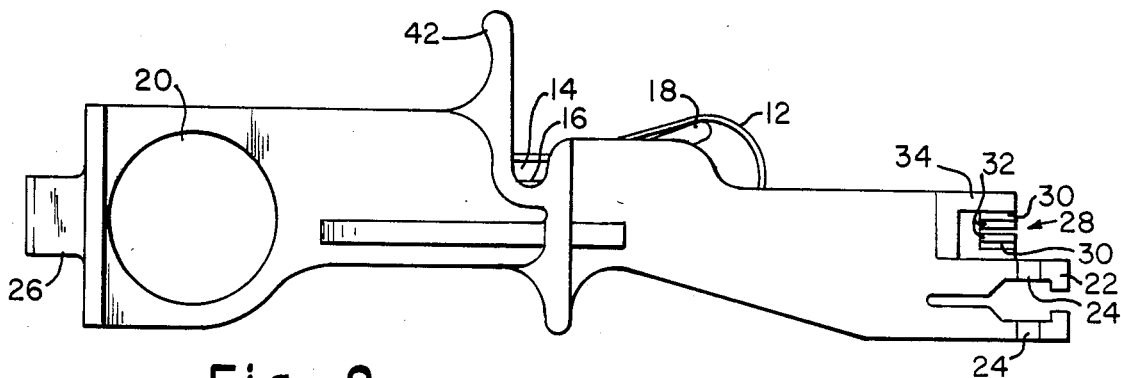
FIG. 2 is a rear elevation view of the telephone equipment installation tool of FIG. 1.

Referring jointly to FIGS. 1 and 2, a multi-purpose installation tool for telephone terminal equipment identified generally at 10 is shown. The hand-held installation tool 10 of the present invention has a variety of functions, some of which are similar to prior art tools but have been adapted for use on terminal equipment used in such countries as Great Britain.

One such prior art feature and device is a cable jacket removal means comprising a clamp spring 12 which acts to clamp or hold down a running cable (cable not shown) within a cable jacket removal groove 14 and against a cable jacket stripping blade 16. When a running cable is inserted into the stripping groove 14, the spring clip 12 is snapped down against the stop 18 whereby the blade 16, which sits at the base of the groove 14, cuts into the cable jacket. Subsequently, the entire tool 10 is rotated about the cable by inserting a finger through the finger hold 20 which results in the blade circumferentially severing the cable jacket (but not the conductors within). The cable jacket removal means will strip 2, 3, 4 pair or any other typical running cable which is well known to those skilled in the art.

The telephone equipment installation tool 10 of the present invention also has incorporated therein a staple holder 22 which is specially shaped to conform to the shape of and receive standard CATV cable staples, to therefore be used in conjunction with a standard staple used for securing CATV wire or cable to a desired surface or wall. The staple holder 22 acts in concert with a wire positioner 24 (shown in FIG. 3) to accurately attach the CATV cable. During use, a wire staple (not shown) is placed in the contoured notch of the staple holder 22. Next, the tool 10 is aligned so that the wire positioner 24 which has a smooth arcuate shape overlies and retains the running cable with the tool 10 being positioned over a particular placement spot. Thereafter, a hammer or similar striking instrument is driven against the wire staple whereby the staple is forced into the wall or other desired surface accurately securing the cable. The tool 10 is then removed and the staple is completely hammered into place.

The installation tool 10 of the present invention should be made from a suitable material, preferably plastic, wherein a sufficient amount of flexibility will be imparted therein. This flexibility is necessary so that the tool 10 may be hand-held and bent back away from the wall or other securing surface when installing a staple. The flexibility of the plastic tool 10 will thus alleviate interference between the installer's hand and the installation surface. In a preferred embodiment, the greatest amount of resilience or flexibility should be found in the portion of the tool 10 from the staple holder 22 to the cable jacket removal groove 14.

Figure 3:
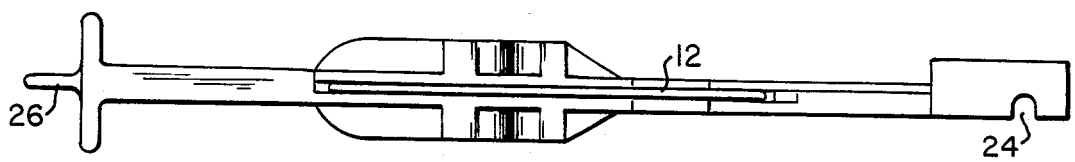
FIG. 3 is a bottom edge view of the telephone equipment installation tool of FIG. 1.

In accordance with the present invention, a convenient means for removing breakout tabs or rectangular knockouts from junction boxes or jack connecting blocks is provided. The knockout or tab removal is accomplished by utilizing a cover knockout tab removal projection 26 for snapping off a thin wall knockout in a junction or wall box. The tab removal projection 26 has a rectangular shape with a relatively thin width as shown in FIG. 3. To operate, the tab removal projection 26 is simply inserted into the slot in the junction box associated with a desired tab or knockout and then the tool is pivoted. The resultant force will snap or bend off the tab, thereby allowing room for cable insertion into the junction or wall box.

In accordance with the present invention, an extremely useful installing device for inserting telephone cable wires into conventional multifingered electrical connectors used in Great Britain is incorporated in the tool and is shown generally at 28. The wire installation tool of the present invention is a punch down tool of the general type of installation tools disclosed in U.S. Pat. Nos. 3,604,092 and 4,194,256 assigned to the assignee hereof, but it is specially configured and structured to be suitable for telephone systems of the type used in Great Britain.

Figure 4:
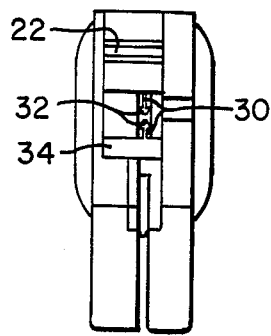
FIG. 4 is a right side view of the telephone equipment installation tool of FIG. 1.
Figure 5:
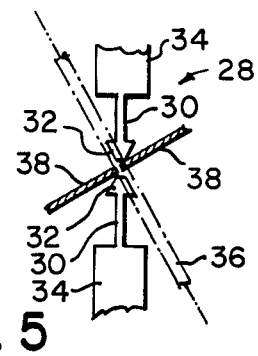
FIG. 5 is an enlarged view of the wire installation portion of FIG. 4 of the telephone installation tool of FIG. 1.

Referring to the detailed drawings shown in FIGS. 4 and 5, the wire installation device 28 comprises two axially opposing fingers 30 each having a blunt edged tapered head 32 thereon. The fingers 30 are attached to the prongs of a fork 34 and extend outwardly toward each other. The fork 34 in turn, is adjacent to, and stepped back from the end of the staple holder 22. The extension of the staple holder 22 out beyond the installation device 28 is necessary for proper installation of a wire into an electrical finger connector. The extended staple holder acts as a guide to properly orient the tool 10 during wire installation.

Referring now to FIG. 5, note that a small predetermined space separates the ends of the tapers 32. This space must be large enough to frictionally secure a telephone wire 36 therebetween. The wire 36 is then inserted between the fingers of a conventional multifingered electrical connector 38 of the type used in Great Britain, as shown in FIG. 5. In connectors used in such countries as Great Britain, the rows of finger connectors 38 are arranged at an angle in relation to the usually rectangular box in which the connectors are located. This differs from the arrangement of fingers in equipment used in such countries as the United States wherein the rows of fingers are perpendicular to the sides of their container.

During wire insertion into a finger connector 38, the equipment installer firmly grasps the tool 10 by wrapping his hand around the convenient handle means provided by shoulder 40 and neck 42. The wire 36 is then placed in the groove between connector fingers, and the taper heads 32 and the tool is positioned vertically above the finger connector. When the installer pushes down upon the tool, the wire is forced between fingers of the metal connector and is simultaneously stripped of its protective insulation. As mentioned, the staple holder 22 will act to guide the tool 10 along a correct path during this wire installation procedure. When the wire is engaged between the fingers of a connector, the tool is brought upward and removed thereby leaving the firmly engaged wire in electrical and physical connection with the appropriate connector.

It should be mentioned that other suitable devices may be incorporated onto the multi-purpose one-piece tool of the present invention such as a measuring ruler or a wire stripper device. It is thought that the particular features incorporated in the preferred embodiment shown in the Figures are probably the most essential functions in working with types of equipment found in such countries as Great Britain.

The novel incorporation of the hereinabove mentioned device on one tool provides an efficient and versatile tool for the telephone equipment installer. The present invention not only provides a tool having novel features, but also eliminates the need for multiple tools. Thus, the present invention is both extremely economical and efficient.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. In a telephone equipment installation tool, the improvement comprising:
    staple holder means for positioning and stapling telephone cable to a surface;
    breakout tab removal means; and
    wire installation means for insertion of telephone wire into multi-fingered electrical connectors, said wire installation means including;
    a two-pronged fork;
    a finger on each of the prongs having a blunt-edged tapered head thereon;
    said fingers with tapered heads thereon being in axial opposition with respect to an axis passing through both fingers; and
    the opposing tapered heads being separated by a predetermined space.

2. The installation tool of claim 1 wherein said staple holder means includes:
    a staple holder having a notch shaped to receive a staple; and
    a wire positioner which retains a wire in a desired position.

3. The installation tool of claim 2 wherein:
    said staple holder has a configuration which conforms to a standard staple for CATV cable.

4. The installation tool of claim 2 wherein:
    said wire positioner has a smooth arcuate shape.

5. The installation tool of claim 1 wherein said breakout tab removal means is a thin, rectangular blade-like projection.

6. The installation tool of claim 1 wherein:
said wire installation means is adjacent to said staple holder means.

7. The installation tool of claim 6 wherein:
said staple holder means extends beyond said wire installation means.

8. The installation tool of claim 1 including handle means.

9. In a telephone equipment installation tool, the improvement comprising:
wire installation means for insertion of telephone wire into multi-fingered electrical connectors, said wire installation means including;
a two-pronged fork;
a finger on each of the prongs having a blunt-edged tapered head thereon;
said fingers with tapered heads thereon being in axial opposition with respect to an axis passing through both fingers; and
the opposing tapered heads being separated by a predetermined space.

10. The installation tool of claim 9 including:
staple holder means for positioning and stapling telephone cable to a surface.

11. The installation tool of claim 10 wherein said staple holder means includes:
staple holder having a notch shaped to receive a staple; and
a wire positioner which retains a wire in a desired position.

12. The installation tool of claim 11 wherein:
said staple holder has a configuration which conforms to a standard staple for CATV cable.

13. The installation tool of claim 11 wherein:
said wire positioner has a smooth arcuate shape.

14. The installation tool of claim 9 including:
breakout tab removal means.

15. The installation tool of claim 14 wherein said breakout tab removal means is a thin, rectangular blade-like projection.

16. The installation tool of claim 1 wherein:
said wire installation means is adjacent to said staple holder means.

17. The installation tool of claim 16 wherein:
said staple holder means extends beyond said wire installation means.

18. The installation tool of claim 9 including handle means.

* * * * *